| (12) United States Patent<br>Lu | (10) Patent No.: US 8,896,943 B2<br>(45) Date of Patent: Nov. 25, 2014 |
|---|---|

(54) LENS ASSEMBLY AND METHOD FOR ASSEMBLING THE SAME

(71) Applicant: Himax Technologies Limited, Tainan City (TW)

(72) Inventor: Yin-dong Lu, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 13/803,942

(22) Filed: Mar. 14, 2013

(65) Prior Publication Data

US 2014/0268374 A1    Sep. 18, 2014

(51) Int. Cl.
*G02B 7/02*    (2006.01)

(52) U.S. Cl.
CPC . *G02B 7/025* (2013.01); *G02B 7/02* (2013.01)
USPC .......................................................... 359/819

(58) Field of Classification Search
USPC .......................................................... 359/819
See application file for complete search history.

(56) References Cited

U.S. PATENT DOCUMENTS

| 7,894,147 B2 * | 2/2011 | Kim et al. ...................... 359/824 |
| 2007/0047110 A1 * | 3/2007 | Matsushima ................. 359/819 |
| 2008/0158699 A1 * | 7/2008 | Chen et al. .................... 359/819 |
| 2009/0185284 A1 * | 7/2009 | Tsai ............................. 359/694 |

* cited by examiner

*Primary Examiner* — James Jones

(74) *Attorney, Agent, or Firm* — McClure, Qualey & Rodack, LLP

(57) ABSTRACT

A lens assembly is disclosed, which includes a base and a lens barrel. The base has a front edge, a back edge opposite to the front edge and a passage penetrating the front edge and the back edge. The lens barrel is disposed in the passage and includes a lens and a lens holding member holding the lens, wherein an outer surface of the lens holding member is in contact with an inner wall of the passage, and at least one of the inner wall of the passage and the outer surface of the lens holding member includes a smooth surface, arranged such that a thrust force applied on the lens barrel while assembling the lens assembly causes a sliding movement between the base and the lens barrel on the smooth surface.

19 Claims, 6 Drawing Sheets

LENS ASSEMBLY AND METHOD FOR ASSEMBLING THE SAME

BACKGROUND OF THE INVENTION

1. Field of the Invention

The invention relates to an optical element and a method for assembling the same, in particular relates to a lens assembly that is used to capture image and a method for assembling the same.

2. Description of the Related Art

With a progress of technology, various portable electronic products such as mobile phones, personal digital assistants (PDAs), notebook computers, tablet computers, etc. are generally equipped with a micro camera to facilitate users taking pictures in daily life. With a development trend of continuous improvement in performance and declining in price, the camera function has become a basic function of the portable electronic products.

Generally, a micro camera includes an image sensor and a lens assembly. The image sensor may be a charge coupled device (CCD) or a complementary metal-oxide-semiconductor (CMOS) image sensor, etc. The lens assembly may include a lens barrel and a base, wherein screw portions are disposed on both of the lens barrel and the base, and the lens barrel and the base are assembled via the screw portions. Through a rotation of the lens barrel, the position of the lens barrel relative to the base can be adjusted so as to project an image onto an imaging plane of the image sensor.

Recently, size reduction is a trend for portable electronic products; however, the screw portions may cause an increase in thickness of the lens assembly which cannot satisfy the demand of portability. Therefore, a need exists for a lens assembly that overcomes the structural issues inherent with the conventional lens assembly found in the art.

BRIEF SUMMARY OF THE INVENTION

In this regard, one objective of the disclosure is to provide a lens assembly with no screw portions, in which a lens barrel of the lens assembly is moved in a sliding manner to adjust a focal length thereof.

In one embodiment, the lens assembly comprises a base and a lens barrel. The base has a front edge, a back edge opposite to the front edge and a passage penetrating the front edge and the back edge. The lens barrel is disposed in the passage and comprises a lens and a lens holding member holding the lens. An outer surface of the lens holding member is in contact with an inner wall of the passage, and at least one of the inner wall of the passage and the outer surface of the lens holding member comprises a smooth surface, arranged such that a thrust force applied on the lens barrel while assembling the lens assembly causes a sliding movement between the base and the lens barrel on the smooth surface.

In the above-mentioned embodiment, the base comprises a protrusion protruding from the inner wall of the passage, and the protrusion has at least one insertion hole penetrated through the protrusion along a direction parallel to a longitudinal axis of the passage.

In the above-mentioned embodiment, the protrusion is circumferentially protruding from the inner wall of the passage to define a through hole which is able to allow light from the lens to pass through.

In the above-mentioned embodiment, the lens has a light emitting surface comprising a first segment and a second segment peripherally surround the first segment, wherein the second segment comprises a flat surface which is aligned with the insertion hole.

In the above-mentioned embodiment, the protrusion is closer to the back edge than the front edge. The inner wall of the passage comprises a smooth surface, and the smooth surface connecting between the front edge and a surface of the protrusion.

In the above-mentioned embodiment, a width of the passage in a direction vertical to a longitudinal axis of the passage is larger or equal to a width of the lens holding member in the direction vertical to a longitudinal axis of the passage.

In the above-mentioned embodiment, the base has at least one groove disposed on the front edge and connected to the passage, and an adhesive is applied in the groove to fix the lens barrel.

In the above-mentioned embodiment, the outer surface of the lens holding member comprises a smooth surface and a recession disposed on the smooth surface.

In the above-mentioned embodiment, the lens holding member comprises a top wall and a peripheral wall extending from the top wall, and the top wall and the peripheral wall cooperatively defining an accommodating space, wherein the lens is disposed in the accommodating space and the peripheral wall.

The disclosure also provides a method for assembling the lens assembly according to any one of the embodiments set forth, the method comprises: providing a base with a passage; placing a lens barrel in the passage of the base; providing a thrust force on the lens barrel to cause a sliding movement between the base and the lens barrel; and fixing the lens barrel in the passage.

In the above-mentioned embodiment, the method further comprises moving the lens barrel to a predetermined position in the passage according to a focal length of a lens of the lens barrel.

Since the lens barrel and the base are connected each other by smooth surface(s) rather than screw portions, the thickness of side walls of the lens barrel and the base can be reduced. Additionally, since the lens barrel can be slid to a predetermined position in the base by directly applying a trust force thereon, instead of by rotating, the assembling time of the lens assembly is further reduced.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the application are described with reference to FIGS. 1 through 6, which generally relate to the generation of a secret key. It is to be understood that the following disclosure provides various different embodiments as examples for implementing different features of the application. This description is made for the purpose of illustrating the general principles of the invention and should not be taken in a limiting sense.

Figure 1:
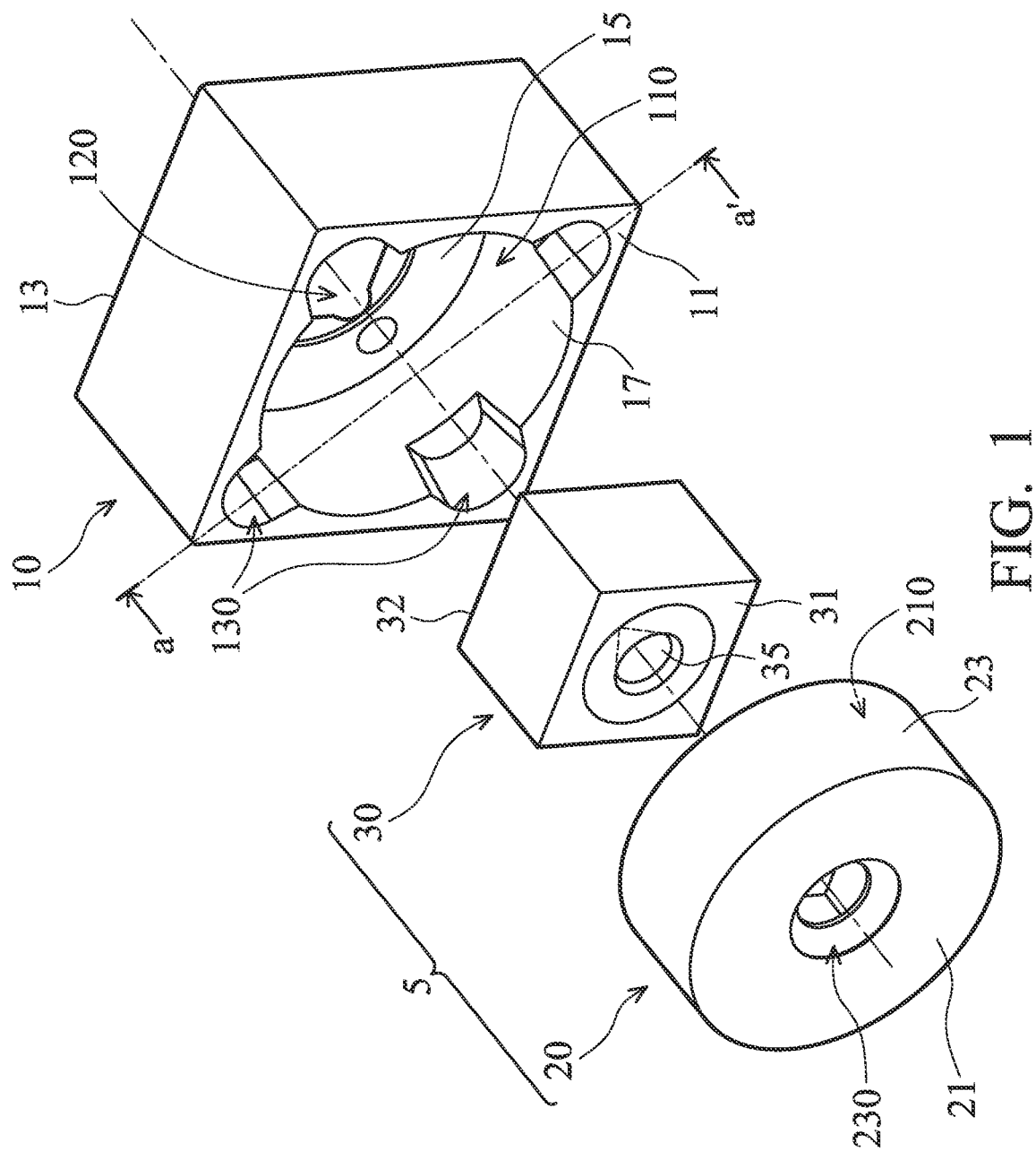
FIG. 1 shows a explosive view of a lens assembly in accordance with one embodiment of the disclosure.

Referring to FIG. 1, the lens assembly 1 of the disclosure includes a lens barrel 5 and a base 10, and the lens barrel 5 includes a lens holding member 20 and a lens 30 held by the lens holding member 20. While assembly the lens assembly 1, the lens barrel 5 is mounted on the base 10, so that a focal length between the lens barrel 5 and an image sensor (not shown) which is connected to the base 10 is stably maintained.

Figure 2:
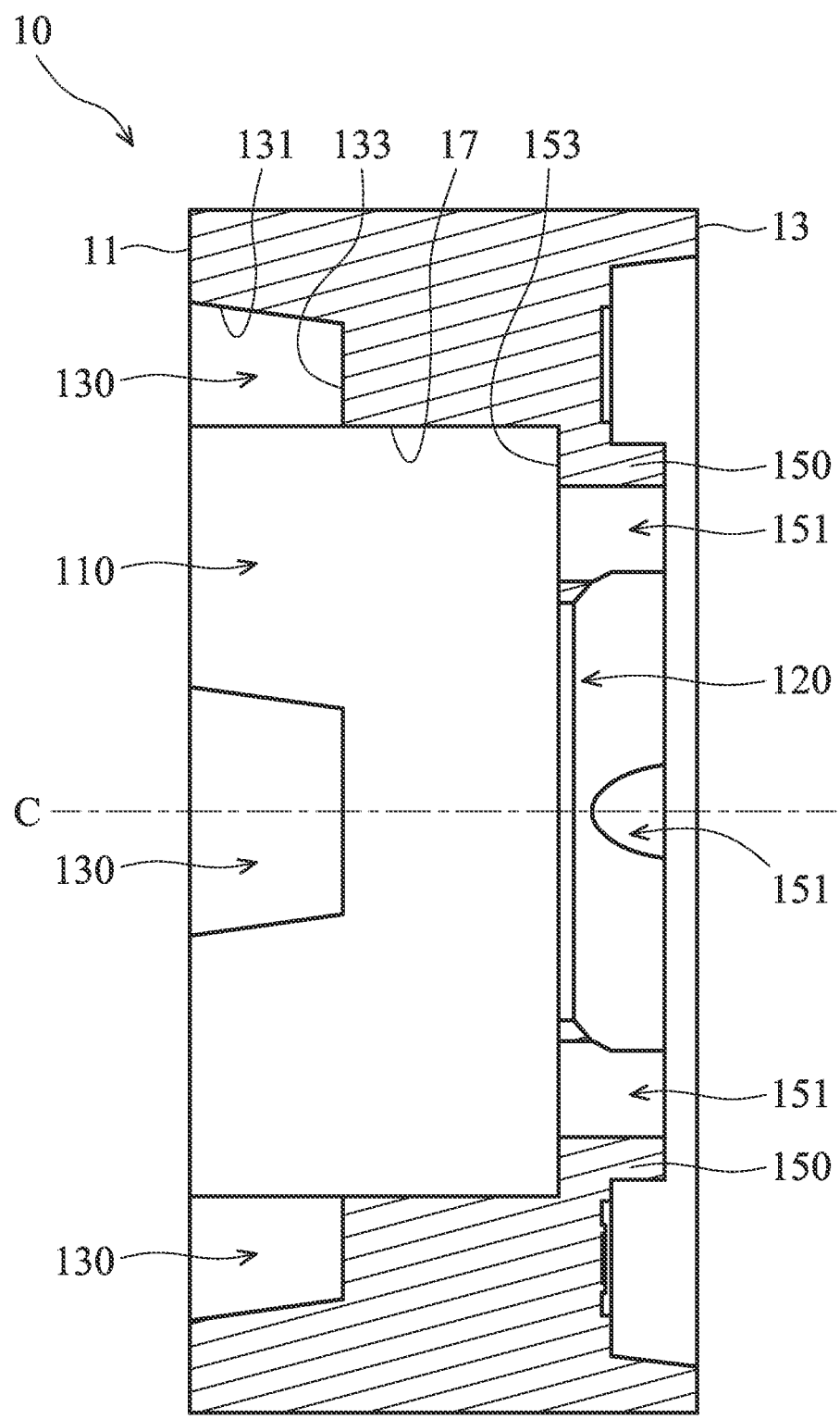
FIG. 2 shows a cross-sectional view of a base of the lens assembly taken along a-a' line of FIG. 1.

The structural features of the lens barrel 5 and the base 10 are described in details. The base 10 has a front edge 11 and a back edge 13 opposite to the front edge 11. The front edge 11 and the back edge 13 of the base 10 are penetrated by a passage 110, and a plurality of grooves 130 are disposed on the front edge 11 of the base 10 and connected to the passage 110, respectively. As shown in FIG. 2, each of the grooves 130 has a first side wall 131 and a second side wall 133, wherein the first side wall 131 is connected with the front edge 11 of the base 10 and the second side wall 133 is connected between the first side wall 131 and an inner wall 17 of the passage 110.

The base 10 includes a protrusion 150 circumferentially protruding from the inner wall 17 of the passage 110 to define a through hole 120 near the back edge 13 of the base 10, wherein a plurality of insertion holes 151 penetrates the protrusion 150 along a direction parallel to a longitudinal axis C of the passage 110. In the embodiment, a part of the inner wall 17 of the passage 110 connecting between the front edge 11 of the base 10 and a surface 153 of the protrusion 150 is a smooth circular surface. The advantage of the feature will be described in the description referring to FIGS. 3 and 4.

Referring to FIG. 1, the lens holding member 20 includes a top wall 21 and a peripheral wall 23 extending from the top wall 21, and the top wall 21 and the peripheral wall 23 cooperatively defining an accommodating space 210. An opening 230 is disposed on a center of the top wall 21 of the lens holding member 20 and communicating with the accommodating space 210. In the embodiment, an outer surface 231 of the peripheral wall 23 is a smooth circular surface.

The lens 30 has a light incident surface 31 and a light emitting surface 32 opposite to the light incident surface 31. The light emitting surface 32 includes a first segment 33 and a second segment 34, wherein the first segment 33 is aligned with a center 35 of the light incident surface 31, and the second segment 34 is a flat surface which peripherally surrounds the first segment 33.

Figure 3:
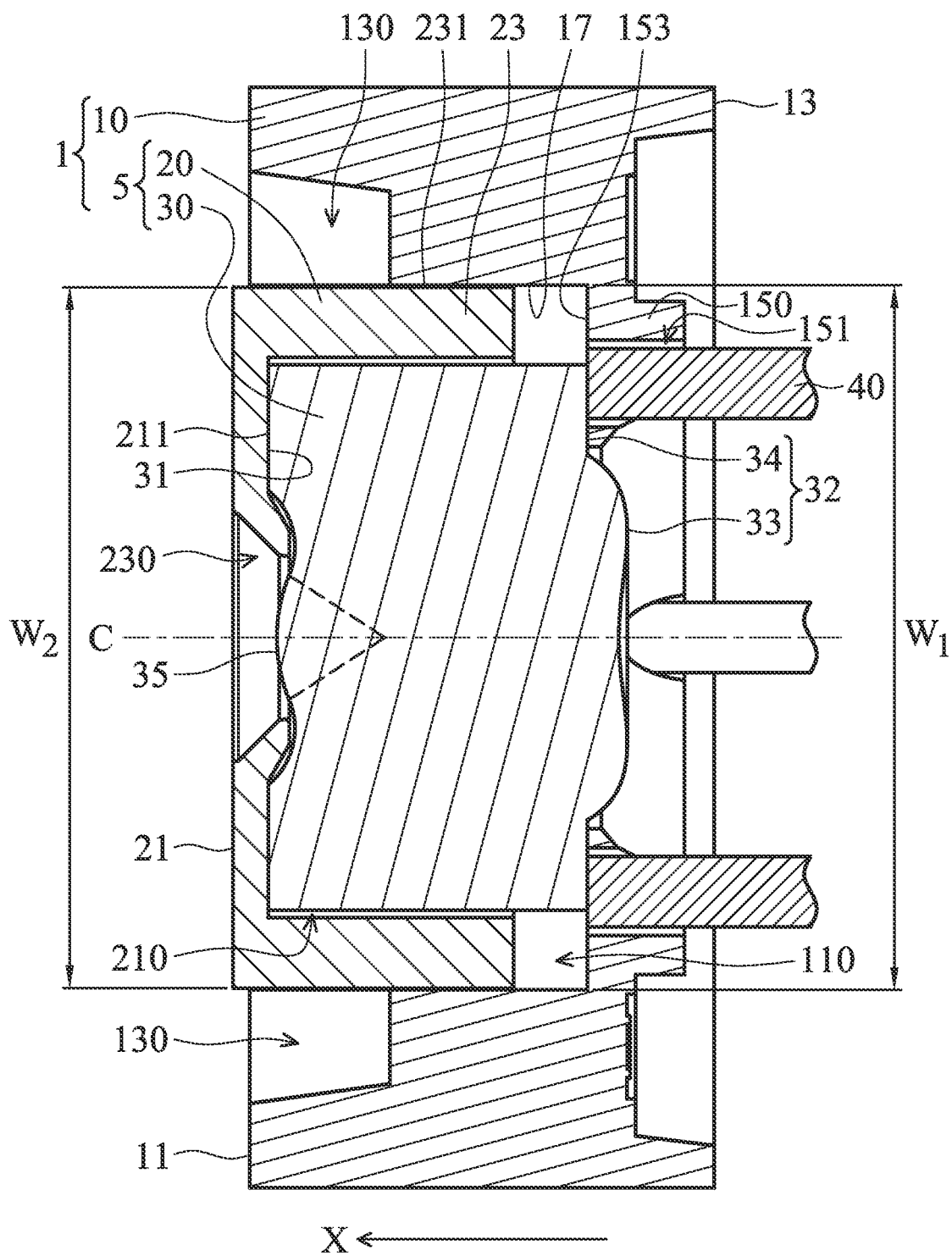
FIGS. 3-5 show the assembly processes of the lens assembly.

Referring to FIG. 3, in an exemplary embodiment, while assembling the lens assembly 1, the lens 30 is mounted into the accommodating space 210 in advanced, wherein the center 35 of the light incident surface 31 is aligned with the opening 230, and the light emitting surface 32 is exposed out of the accommodating space 210.

Next, the lens barrel 5 including the lens holding member 20 and the lens 30 is mounted into the passage 110 through the front edge 11. Specifically, the lens barrel 5 is linearly moved in the passage 110 until the second segment 34 of the light emitting surface 32 abuts the surface 153 of the protrusion 150 and the second segment 34 is aligned with the insertion hole 151. In the movement of the lens holding member 20, the outer surface 231 of the lens holding member 20 is in contact with the inner wall 17 of the passage 110. Next, the lens barrel 5 is applied by a thrust force through a plurality of pins 40 of a mounting apparatus (not shown) so as to move in a direction X away from the protrusion 150 to a predetermined position in the passage 110 according to a focal length of the lens 30.

It is noted that, in the embodiment, a width $W_1$ of the passage 110 in a direction X vertical to a longitudinal axis C of the passage 110 is slightly larger or equal to a width $W_2$ of the lens holding member 20 in the direction X vertical to the longitudinal axis C of the passage 110, and both of the inner wall 17 of the base 10 and the outer surface 231 of the lens holding member 20 are smooth circular surface. Therefore, a sliding movement between the inner wall 17 of the base 10 and the outer surface 231 of the lens holding member 20 may occurred. Moreover, by the guiding of insertion holes 151, the pins 40 may properly contact with the second segment 34 of the light emitting surface 32. Thus, the fracture of the lens 30 due to impaction of the pins 40 in a slant angle can be prevented.

Figure 4:
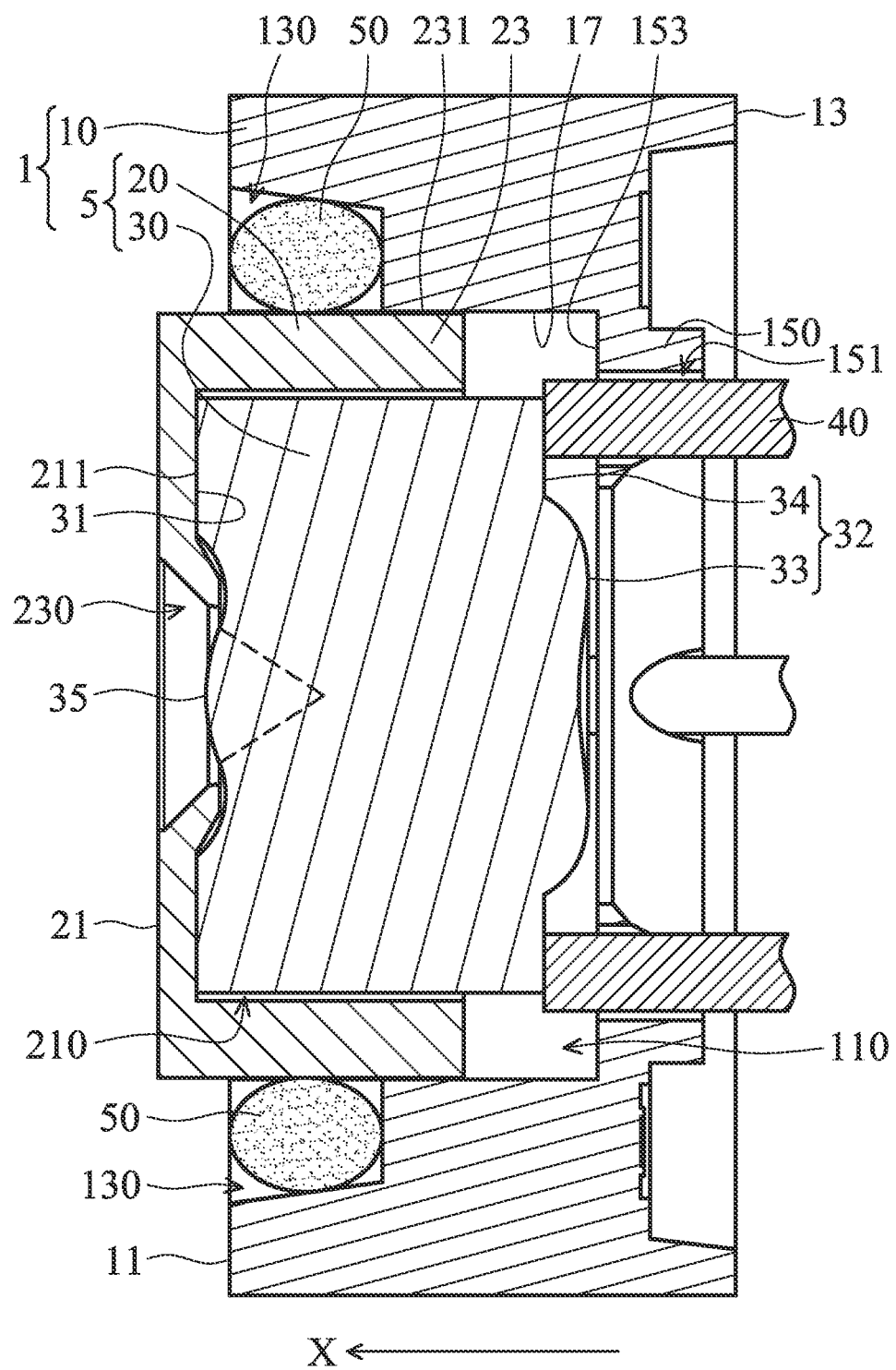
Figure 5:
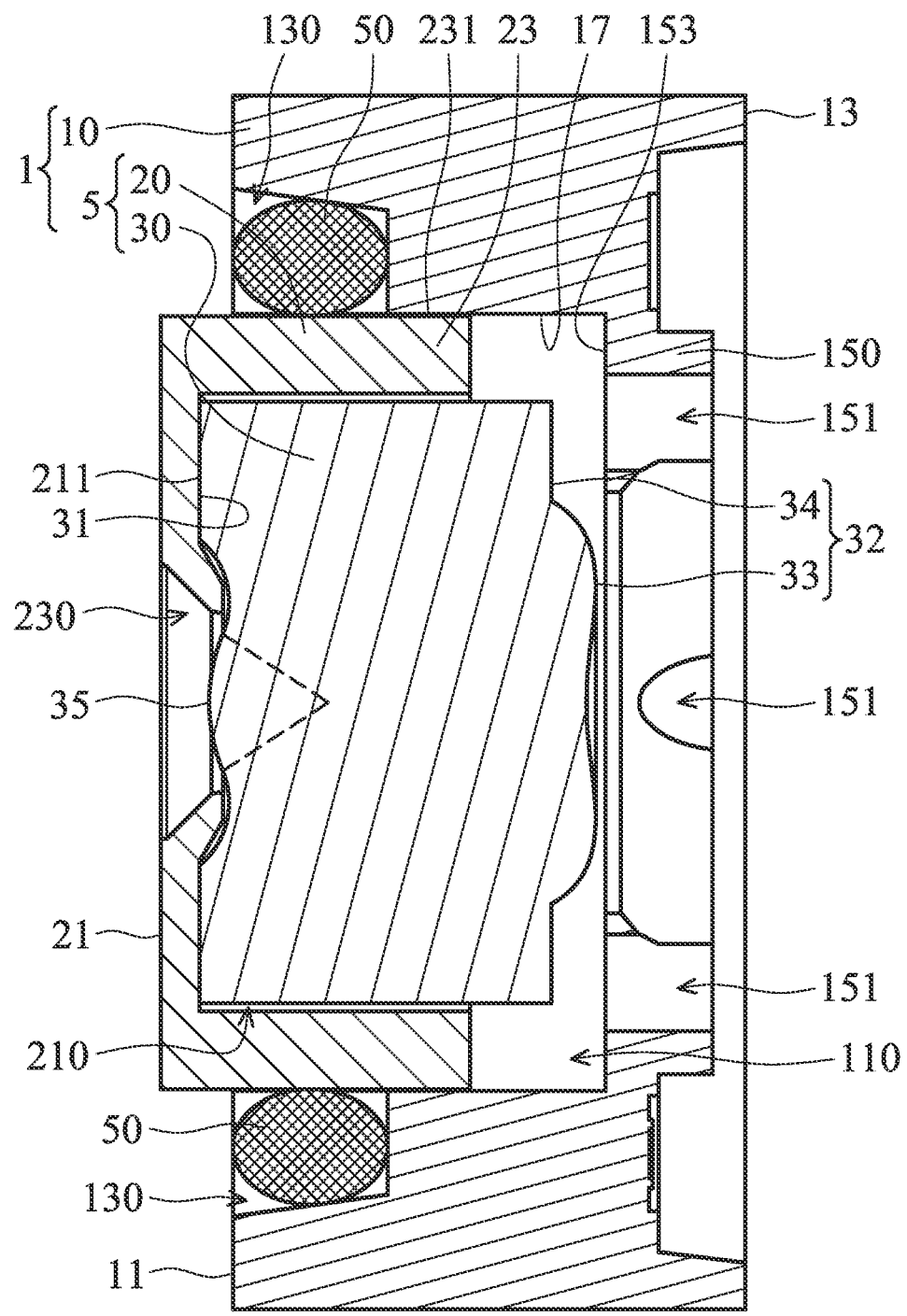

Referring to FIG. 4, after the position of the lens barrel 5, an adhesive 50 is dispensed into the groove 130 to fix the lens barrel 5 in place, wherein the adhesive 50 is disposed between the outer surface 231 of the lens holding member 20 and the groove 130 of the base 10. In the next step, as shown in FIG. 5, the adhesive 50 may be cured by exposure to ultraviolet light (not shown), and the pins 40 are removed from the insertion holes 151, so as to complete the assembling process of the lens assembly 1.

It is noted that while the protrusion 150 circumferentially protrudes from the inner wall 17 of the passage 110 in the above-mentioned embodiment, it should not be limited thereto. In some embodiments, the base 10 includes a plurality of protrusions 150 protrusions 150 spaced apart with each other in the same or different distance are respectively protruded from an inner wall 17 of the passage 110, and each of the protrusions 150 has a insertion hole 151 to allow the pins 40 of the mounting apparatus (not shown) passing therethrough. In still some the other embodiments, the insertion hole 151 is omitted, the pins 40 of the mounting apparatus (not shown) are directly inserted into the through holes 120 defined by the protrusion 150 to abut the lens 30.

It is appreciated that the configuration of the inner wall 17 of the passage 110 and the configuration of the outer surface 231 of the lens barrel 5 may be modified into any suitable configuration according to demands which is compatible with the dimensions of each other. In addition, it is not necessary that both of the inner wall 17 of the passage 110 and the outer surface 231 of the lens barrel 5 are smooth surface. In some embodiment, at least one of the inner wall of the passage and the outer surface of the lens holding member comprises a smooth surface, the lens holding member 20 may slide in the passage 110.

Figure 6:
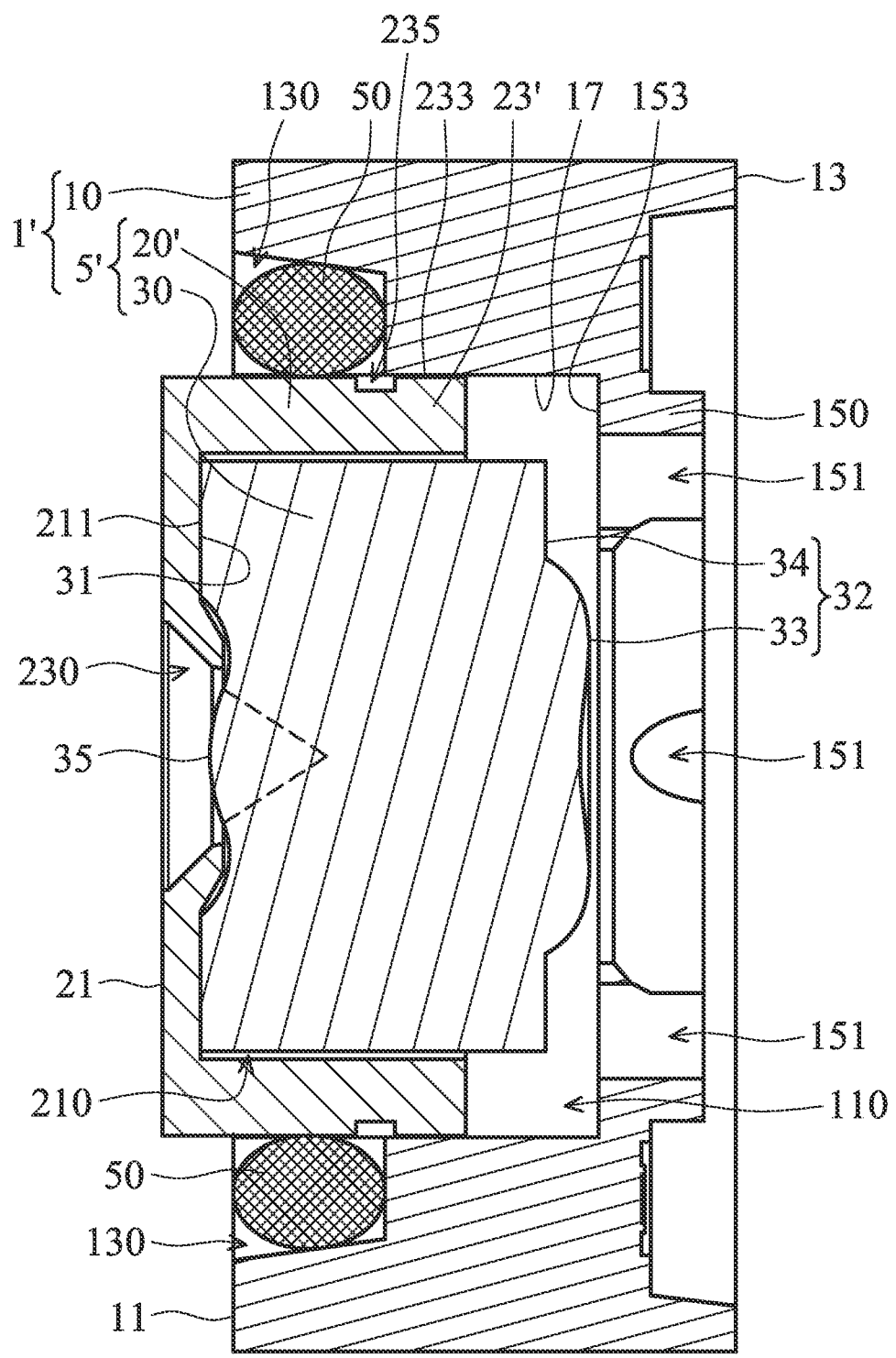
FIG. 6 shows a cross-sectional view of a lens assembly 1 in accordance with the other embodiment of the disclosure.

Referring to FIG. 6, a cross-sectional view of a lens assembly 1' in accordance with the other embodiment is shown in FIG. 6, in which elements similar with that of liquid lens assembly 1 shown in FIGS. 1-5 are provided with the same reference numbers, and the features thereof are not reiterated in the interest of brevity. The lens assembly 1' differs from the lens assembly 1 in that the side wall 23' of the lens holding member 20' of a lens barrel 5' includes a smooth circular surface 233 and a recession 235 disposed on the smooth circular surface 233, since the contact area between the inner wall 17 of the passage 110 and the smooth circular surface 233 of the lens barrel 5' is decreased, the friction force produced therebetween due to the sliding movement is decreased and less trust force is necessary to be applied to the lens 30 to make it move.

In the disclosure, the position of the lens barrel in the base is adjusted in a sliding manner, wherein no screw portion is necessary to be formed between the lens barrel and the base. Thus, a thickness of the base and the lens holding member may be reduced and there may be more accommodation space for lens, especially for a lens applied to a camera having high image quality, in a compactness electrical device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly, comprising:
a base having a front edge, a back edge opposite to the front edge and a passage penetrating the front edge and the back edge; and
a lens barrel disposed in the passage and comprising a lens and a lens holding member holding the lens, wherein an outer surface of the lens holding member is in contact with an inner wall of the passage, and the outer surface of the lens holding member comprises a uniform surface extending from a front end of the lens holding member to a rear end of the lens holding member, arranged such that a thrust force applied on the lens barrel while assembling the lens assembly causes a sliding movement between the base and the lens barrel on the uniform surface,
wherein the base has at least one groove disposed on the front edge and connected to the passage, and an adhesive is applied in the groove to fix the lens barrel.

2. The lens assembly as claimed in claim 1, wherein the base comprises a protrusion protruding from the inner wall of the passage, and the protrusion has at least one insertion hole penetrated through the protrusion along a direction parallel to a longitudinal axis of the passage.

3. The lens assembly as claimed in claim 2, wherein the protrusion is circumferentially protruding from the inner wall of the passage to define a through hole which is able to allow light from the lens to pass through.

4. The lens assembly as claimed in claim 2, wherein the lens has a light emitting surface comprising a first segment and a second segment peripherally surround the first segment, wherein the second segment comprises a flat surface which is aligned with the insertion hole.

5. The lens assembly as claimed in claim 2, wherein the protrusion is closer to the back edge than the front edge.

6. The lens assembly as claimed in claim 2, wherein the inner wall of the passage comprises a uniform surface, and the uniform surface of the passage connects the front edge to a surface of the protrusion.

7. The lens assembly as claimed in claim 1, wherein a width of the passage in a direction vertical to a longitudinal axis of the passage is larger or equal to a width of the lens holding member in the direction vertical to a longitudinal axis of the passage.

8. The lens assembly as claimed in claim 1, wherein a recession is disposed on the uniform surface of the outer surface of the lens holding member.

9. The lens assembly as claimed in claim 1, wherein the lens holding member comprises a top wall and a peripheral wall extending from the top wall, and the top wall and the peripheral wall cooperatively defining an accommodating space, wherein the lens is disposed in the accommodating space and the peripheral wall.

10. A method for assembling a lens assembly, comprising:
providing a base with a passage;
placing a lens barrel in the passage of the base;
moving a pin to provide a thrust force on the lens barrel and cause a sliding movement between the base and the lens barrel;
fixing the lens barrel by an adhesive provided between the lens barrel and the base; and
removing the pin to complete the lens assembly.

11. The method as claimed in claim 10, further comprising moving the lens barrel to a predetermined position in the passage according to a focal length of a lens of the lens barrel.

12. A lens assembly, comprising:
a base having a front edge, a back edge opposite to the front edge and a passage penetrating the front edge and the back edge, wherein the base comprises a protrusion protruding from the inner wall of the passage, and the protrusion has a plurality of insertion holes respectively penetrated through the protrusion along a direction parallel to a longitudinal axis of the passage; and
a lens barrel disposed in the passage and comprising a lens and a lens holding member holding the lens, wherein an outer surface of the lens holding member is in contact with an inner wall of the passage, and the inner wall of the passage comprises a uniform surface connecting the front edge to a surface of the protrusion, arranged such that a thrust force applied on the lens barrel while assembling the lens assembly causes a sliding movement between the base and the lens barrel on the uniform surface.

13. The lens assembly as claimed in claim 12, wherein the protrusion is circumferentially protruding from the inner wall of the passage to define a through hole which is able to allow light from the lens to pass through.

14. The lens assembly as claimed in claim 12, wherein the lens has a light emitting surface comprising a first segment and a second segment peripherally surround the first segment, wherein the second segment comprises a flat surface which is aligned with the insertion holes.

15. The lens assembly as claimed in claim 12, wherein the protrusion is closer to the back edge than the front edge.

16. The lens assembly as claimed in claim 12, wherein a width of the passage in a direction vertical to a longitudinal axis of the passage is larger or equal to a width of the lens holding member in the direction vertical to a longitudinal axis of the passage.

17. The lens assembly as claimed in claim 12, wherein the base has at least one groove disposed on the front edge and connected to the passage, and an adhesive is applied in the groove to fix the lens barrel.

18. The lens assembly as claimed in claim 12, wherein the outer surface of the lens holding member comprises a uniform surface extending from a front end of the lens holding member to a rear end of the lens holding member.

19. The lens assembly as claimed in claim 18, wherein a recession is disposed on the uniform surface of the outer surface of the lens holding member.

* * * * *